(12) United States Patent
Eckert et al.

(10) Patent No.: US 9,450,465 B2
(45) Date of Patent: Sep. 20, 2016

(54) CONTINUOUS STATOR WINDING WOUND ON BOBBINS

(71) Applicant: SIEMENS AKTIENGESELLSCHAFT, München (DE)

(72) Inventors: Rainer Eckert, Bad Neustadt/Herschfeld (DE); Jürgen Pawellek, Unsleben (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/903,894

(22) PCT Filed: Aug. 27, 2013

(86) PCT No.: PCT/EP2013/067666
§ 371 (c)(1),
(2) Date: Jan. 8, 2016

(87) PCT Pub. No.: WO2015/003757
PCT Pub. Date: Jan. 15, 2015

(65) Prior Publication Data
US 2016/0156242 A1    Jun. 2, 2016

(30) Foreign Application Priority Data

Jul. 11, 2013   (EP) .................................... 13176073

(51) Int. Cl.
*H02K 11/00* (2016.01)
*H02K 3/52* (2006.01)
(Continued)

(52) U.S. Cl.
CPC ............... *H02K 3/522* (2013.01); *H02K 3/28* (2013.01); *H02K 3/325* (2013.01); *H02K 15/065* (2013.01); *H02K 2203/12* (2013.01)

(58) Field of Classification Search
CPC ............. H02K 3/522; H02K 2203/09; H02K 2203/12; Y10T 29/49009; Y10T 29/49071; Y10T 29/49073
USPC ................ 310/68 R, 71, 194, 179–180, 184; 29/596, 598, 606
See application file for complete search history.

(56) References Cited

U.S. PATENT DOCUMENTS 7,202,582 B2    4/2007   Eckert et al.
7,692,356 B2    4/2010   Eckert et al.
(Continued)

FOREIGN PATENT DOCUMENTS

DE          102 31 596 A1     1/2004
DE    10 2009 023 231 A1    12/2010
(Continued)

*Primary Examiner* — Thanh Lam
(74) *Attorney, Agent, or Firm* — Henry M. Feiereisen LLC (57) ABSTRACT

In a method for producing a stator winding of a stator, an auxiliary element is positioned with its central axis in alignment with a central axis of the stator. Bobbins are arranged on the auxiliary element in uniformly spaced-apart relationship around the central axis of the auxiliary element, and a circuit carrier is arranged on the auxiliary element radially inside the bobbins. Coils are formed by winding a conductor wire for each phase of the stator winding onto a corresponding one of the bobbins and routed via the circuit carrier to another one of the bobbins of this phase and wound thereon. Each of the bobbins is pivoted with the coils about a pivot so as to enable the bobbins to pivot up onto radially outwardly protruding stator teeth of the stator from radially outside.

15 Claims, 8 Drawing Sheets

(51) Int. Cl.
*H02K 3/32* (2006.01)
*H02K 3/28* (2006.01)
*H02K 15/06* (2006.01)

(56) References Cited

U.S. PATENT DOCUMENTS

| | | |
|---|---|---|
| 7,712,367 B2 | 5/2010 | Eckert et al. |
| 8,072,103 B2 | 12/2011 | Eckert et al. |
| 8,159,099 B2 | 4/2012 | Eckert et al. |
| 8,188,628 B2 | 5/2012 | Eckert et al. |
| 8,354,769 B2 * | 1/2013 | Naganawa ............. H02K 1/146 310/216.077 |
| 2005/0218747 A1 | 10/2005 | Sponar et al. |
| 2008/0122301 A1 * | 5/2008 | Okada ................... H02K 3/522 310/43 |
| 2008/0290761 A1 | 11/2008 | Eckert et al. |
| 2009/0026870 A1 * | 1/2009 | Hoshino ................ H02K 3/522 310/194 |
| 2009/0230793 A1 | 9/2009 | Hirao |
| 2009/0243408 A1 * | 10/2009 | Ueta ..................... H02K 1/148 310/71 |
| 2012/0112582 A1 * | 5/2012 | Kim ..................... B62D 5/0403 310/71 |
| 2012/0262014 A1 * | 10/2012 | Katou ................... H02K 3/522 310/71 |

FOREIGN PATENT DOCUMENTS

| | | |
|---|---|---|
| EP | 1 783 880 A2 | 5/2007 |
| EP | 2 059 991 A1 | 5/2009 |
| EP | 2 549 622 A1 | 1/2013 |

* cited by examiner

CONTINUOUS STATOR WINDING WOUND ON BOBBINS

CROSS-REFERENCES TO RELATED APPLICATIONS

This application is the U.S. National Stage of International Application No. PCT/EP2013/067666, filed Aug. 27, 2013, which designated the United States and has been published as International Publication No. WO 2015/003757 and which claims the priority of European Patent Application, Serial No. 13176073.8, filed Jul. 11, 2013, pursuant to 35 U.S.C. 119(a)-(d).

BACKGROUND OF THE INVENTION

The present invention relates to a production method for producing a stator winding of a stator having a plurality of stator teeth which protrude radially outward starting from a connecting structure that extends circumferentially around a central axis of the stator spaced at a radial distance from the central axis of the stator.

The present invention furthermore relates to a stator,
wherein the stator has a plurality of stator teeth which protrude radially outward starting from a connecting structure that extends circumferentially around a central axis of the stator spaced at a radial distance from the central axis of the stator,
wherein bobbins are arranged on the stator teeth in such a way that the bobbins are spaced at a radial distance from the central axis of the stator and, viewed tangentially around the central axis of the stator, are arranged in a uniformly distributed manner around the central axis of the stator,
wherein a circuit carrier is arranged at an axial end of the bobbins,
wherein a conductor wire is wound onto each one of the bobbins such that the conductor wire wound onto the bobbin forms a coil of a stator winding of the stator.

A stator of said kind may be the stator of an external rotor, for example. Alternatively, the stator may be the inner part of an assembly referred to as a star-yoke pack. A star-yoke pack of said kind is known from EP 2 549 622 A1.

In the prior art, the production of a stator winding of a stator having stator teeth protruding radially outward often entails winding the bobbins individually with a respective conductor wire. The bobbins are thereafter push-mounted onto the stator teeth. In the case of a stator embodied as a star-yoke pack, the yoke is then push-fitted onto the star. Insulating elements known as phase separators are then injected, the circuit carrier is push-mounted thereon, and the conductor wires of the conductor wires individually wound onto the bobbins are connected to one another inside the circuit carrier.

In particular the connecting of the conductor wires of the individual coils to one another is a complex and error-prone manufacturing process. If this operation is performed manually it is time-consuming and laborious into the bargain.

SUMMARY OF THE INVENTION

The object of the present invention consists in creating possibilities by means of which a stator having outward protruding stator teeth can be connected in a more straightforward manner.

The object is achieved according to the invention by a production method for producing a stator winding of a stator having a plurality of stator teeth which protrude radially outward starting from a connecting structure that extends circumferentially around a central axis of the stator spaced at a radial distance from the central axis of the stator is embodied in that
bobbins are arranged on an auxiliary element in such a way that the bobbins are spaced at a radial distance from a central axis of the auxiliary element and, viewed tangentially around the central axis of the stator, are arranged in a uniformly distributed manner around the central axis of the auxiliary element,
a circuit carrier is arranged on the auxiliary element radially inside the bobbins,
for each phase of the stator winding, a respective conductor wire is wound onto bobbins associated with the respective phase in such a way that the respective conductor wire wound onto the respective bobbins forms respective coils of the stator winding,
after each one of the bobbins has been wound, the respective conductor wire is routed via the circuit carrier to the next bobbin of the respective phase that is to be wound, and
the auxiliary element is arranged relative to the stator in such a way that the central axis of the auxiliary element is aligned with the central axis of the stator, and the bobbins provided with the coils are then pivoted about a respective pivot axis that extends tangentially to the central axes in the vicinity of the circuit carrier such that the bobbins provided with the coils are pivoted up in each case onto one of the stator teeth from radially outside.

Advantageous embodiments of the production method according to the invention are the subject matter of dependent claims.

The pivoting-up movement can be embodied as necessary. In order to be pivoted up onto the stator teeth, the bobbins are preferably pivoted through at least 90° about the respective pivot axis. Starting from this angle, the bobbins are easily accessible so that they can be wound with the respective conductor wire. In particular, they can be pivoted through 180° about the respective pivot axis. This embodiment is particularly compact. Furthermore, the bobbins are in this case arranged in a similar configuration to that subsequent to being pivoted up on the auxiliary element. The pivoting movement can furthermore be a true pivoting movement, such that the final leg of the movement of the bobbins is also a pivoting movement. Alternatively, upon termination of the pivoting movement the respective bobbin can be positioned immediately in front of the respective stator tooth such that the final leg of the movement entails push-fitting the respective bobbin onto the respective stator tooth.

The conductor wires of the phases are preferably routed free of crossovers in the circuit carrier. To that end, the conductor wires of the phases can be routed in the circuit carrier alternatively in a radially or axially offset manner from phase to phase.

If the conductor wires of the phases are routed in an axially offset manner in the circuit carrier, the circuit carrier preferably has one carrier section per phase in each case. In this situation one of the carrier sections is initially arranged on the auxiliary element. The respective next carrier section is not mounted onto the respective previous carrier section until after the conductor wire has been wound to form the coils of the respective phase. This approach offers advantages both in terms of manufacturing processes and with regard to compliance with creepage distances and clearances in air that are to be maintained for safety reasons. The carrier sections can be embodied identically to one another.

It is possible that no direct connection exists between the bobbins and the circuit carrier. Alternatively, it is possible for each one of the bobbins to have a hinge via which it is connected to the circuit carrier.

Generally, each of the bobbins has a first and a second bobbin flange, the first bobbin flange facing toward the connecting structure and the second bobbin flange facing away from the connecting structure in the state in which the bobbins are pivoted up onto the stator teeth. Preferably, the second bobbin flange has a lead-in groove for introducing the conductor wire into a winding region of the respective bobbin that is delimited by the bobbin flanges, wherein in the state in which the bobbins are pivoted up onto the stator teeth the lead-in groove does not extend truly axially with respect to the central axis of the stator, but has a tangential component in at least one section.

Generally, the first bobbin flange is smaller than the second bobbin flange.

As already mentioned, the production method according to the invention can be employed in an external rotor motor. However, the present invention reveals its full advantages when it is utilized for a stator embodied as a star-yoke pack, i.e. after the bobbins provided with the coils have been pivoted up onto the stator teeth axially with respect to the central axis of the stator, a stator yoke is push-fitted onto the stator teeth.

The object is furthermore achieved according to the invention by a stator of the type cited in the introduction in that for each phase the conductor wire is routed via the circuit carrier in each case from bobbin to bobbin of the respective phase.

Advantageous embodiments of the production method according to the invention are the subject matter of dependent claims.

The advantageous embodiments of the stator substantially correspond to those of the production method. Reference is therefore made to the explanatory remarks given hereinabove.

The above-described characteristics, features and advantages of the instant invention, as well as the manner in which these are realized, will become clearer and more readily understandable in connection with the following description of the exemplary embodiments, which are explained in more detail with reference to the schematic drawings, in which:

DETAILED DESCRIPTION OF PREFERRED EMBODIMENTS

Figure 1:
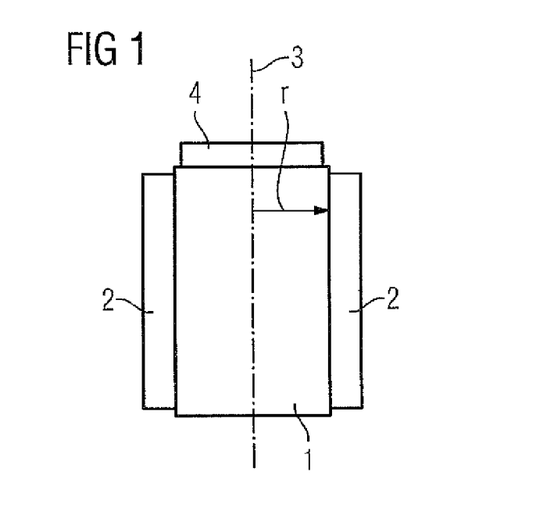
FIG. 1 shows an auxiliary element with bobbins in longitudinal section.
Figure 2:
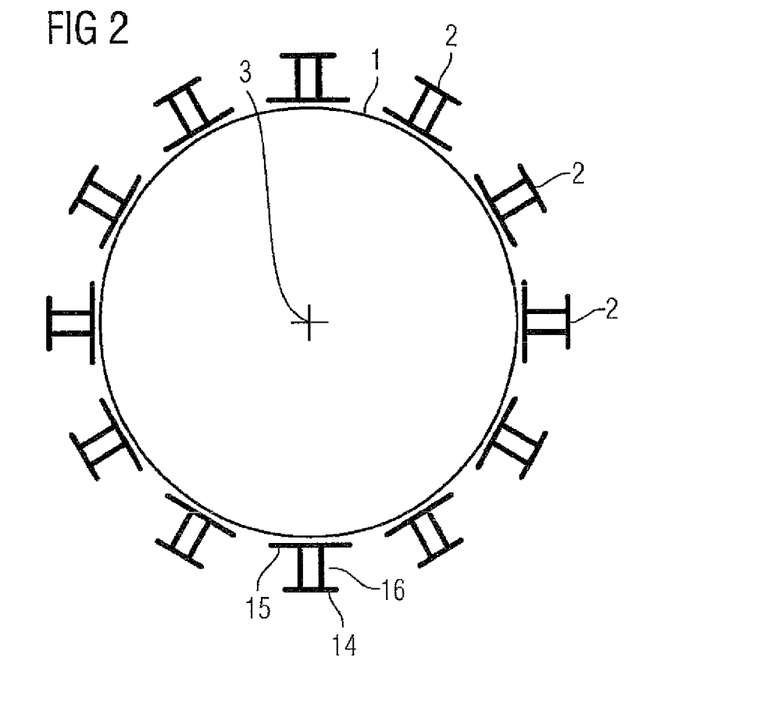
FIG. 2 shows the auxiliary element of FIG. 1 in a plan view.
Figure 3:
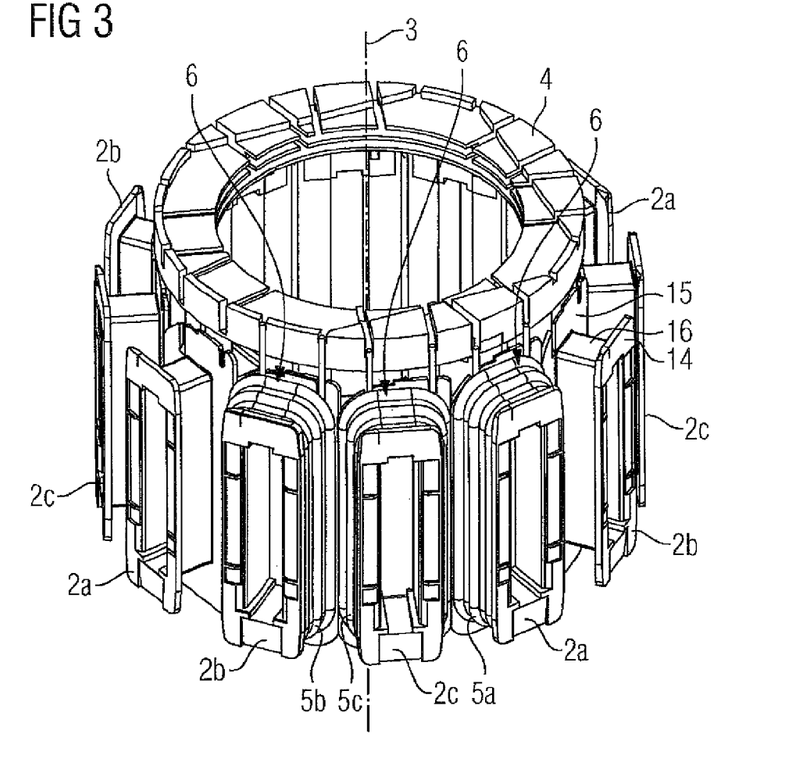
FIG. 3 shows bobbins and a circuit carrier without the auxiliary element of FIG. 1 in a perspective view.

In order to produce a stator winding, bobbins 2 are arranged (=action; as opposed to: are arranged=state) on an auxiliary element 1 in the first instance, as shown in FIGS. 1 to 3. Insofar as reference is made in the following to the bobbins 2 in general, the reference numeral 2 will continue to be used hereinafter. However, the bobbins 2 are in each case associated with one of several electrical phases a to c. In the event that the bobbins 2 of a specific phase are concerned in an actual instance, the reference numeral 2 is suffixed hereinafter with a lowercase letter a to c. The same suffix is also used in connection with other elements whenever an association with the respective phase a to c is concerned.

The bobbins 2 are arranged on the auxiliary element 1 in such a way that the bobbins 2 are spaced at a radial distance r from a central axis 3 of the auxiliary element 1, i.e. are radially spaced apart from the central axis 3 of the auxiliary element 1. The arrangement of the bobbins 2 on the auxiliary element 1 is furthermore realized in such a way that, viewed tangentially around the central axis 3 of the auxiliary element 1, the bobbins 2 are arranged in a uniformly distributed manner around the central axis 3 of the auxiliary element 1.

A circuit carrier 4 is arranged (=action) in addition on the auxiliary element 1. The arrangement of the circuit carrier 4 is effected in such a way that the circuit carrier 4 is arranged radially inside the bobbins 2. The circuit carrier 4 is arranged in addition in such a way that the outer edge of the circuit carrier 4 is arranged in proximity to one of the ends of the bobbins 2.

Figure 4:
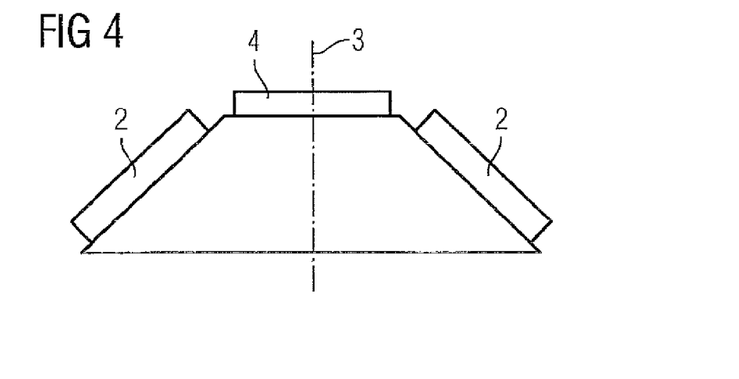
FIGS. 4 and 5 show views of alternative auxiliary elements.
Figure 5:
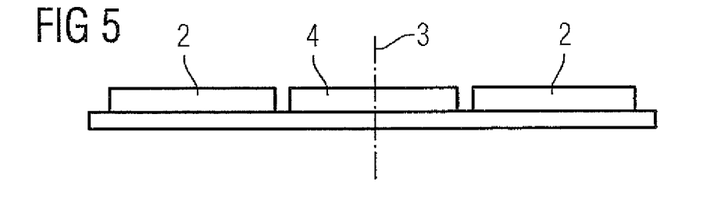

It is currently preferred for the auxiliary element 1 to have a substantially cylindrical structure, such that the bobbins 2 are arranged substantially on a cylinder surface of the auxiliary element 1. Alternatively, the auxiliary element 1 can have substantially the shape of a truncated cone or a disk, as indicated in FIGS. 4 and 5.

Once the bobbins 2 and the circuit carrier 4 have been arranged on the auxiliary element 1, the bobbins 2 are wound. The winding of the bobbins 2 is performed separately for each of the phases a to c. The method of winding the bobbins 2 is the same for each phase a to c. A more detailed explanation is therefore given below for just one of the phases a to c.

In order to wind the bobbins 2a of phase a, a conductor wire 5a is wound onto one of the bobbins 2a of phase a. The winding of the corresponding individual bobbin 2a is also performed as in the prior art and therefore requires no further explanation. As a result of the winding of the conductor wire 5a onto the bobbin 2a of phase a, the conductor wire 5a wound onto the bobbin 2a forms a coil 6 of a stator winding. The conductor wire 5a is then routed via the circuit carrier 4 to the next bobbin 2a of the corresponding phase a that is to be wound.

This operation—i.e. the winding of an individual bobbin 2a of phase a with the conductor wire 5a together with subsequent routing of the conductor wire 5a via the circuit carrier 4 to the next bobbin 2a of the corresponding phase a—is repeated until all of the bobbins 2a of the corresponding phase a have been wound with the conductor wire 5a. The essential difference between the approach according to the invention and the prior art accordingly consists in the fact that, rather than the bobbins 2a of phase a being wound individually with a separate conductor wire in each case and the conductor wires subsequently being connected in the circuit carrier 4, a single, continuous conductor wire 5a is used by means of which the bobbins 2a of the corresponding phase a are wound one after the other.

The method of winding the bobbins 2 is, as already mentioned, the same for each phase a to c. It is therefore repeated for the other phases b and c with a separate conductor wire 5b and 5c in each case for the respective bobbins 2b and 2c of the respective phase b and c.

The stator winding thus produced, i.e. the totality of the coils 6, is to be incorporated into a stator 7 (see FIGS. 6 to 8) having a connecting structure 8 that extends circumferentially around a central axis 9 of the stator 7 spaced at a radial distance r' from the central axis 9 of the stator 7. The stator 7 has a plurality of stator teeth 10. The stator teeth 10 protrude radially outward, starting from the connecting structure 8. In order to mount the stator winding, the auxiliary element 1 is arranged according to FIGS. 6 to 8 in such a way relative to the stator 7 that the central axis 3 of the auxiliary element 1 is aligned with the central axis 9 of the stator 7. In this state the central axis 3 of the auxiliary element 1 can therefore be regarded as a continuation of the central axis 9 of the stator 7. The bobbins 2 including the coils 6 arranged on the bobbins 2—see in particular FIG. 8—are pivoted in this state about a respective pivot axis 11.

Figure 6:
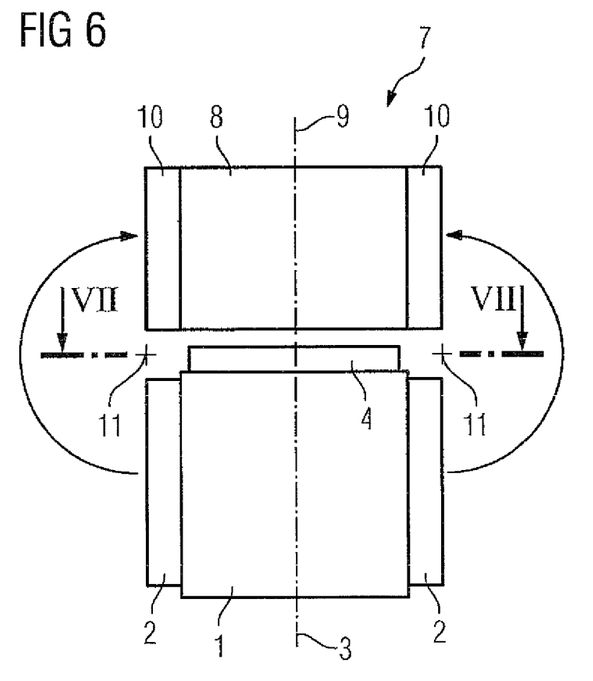
FIG. 6 shows the auxiliary element of FIG. 1 connected to a stator in longitudinal section.
Figure 7:
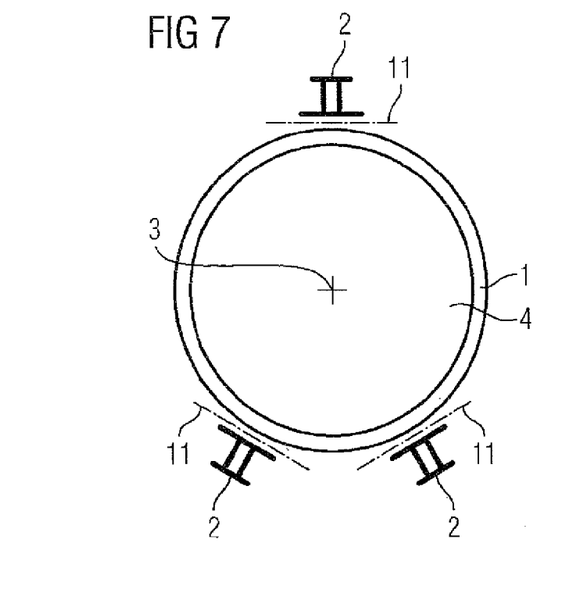
FIG. 7 shows a section along a line VII-VII in FIG. 6.

The respective pivot axis 11 is determined individually for the respective bobbin 2. The pivot axes 11 moreover extend—see in particular FIGS. 6 and 7—in the vicinity of the circuit carrier 4 for all of the bobbins 2. Referred to the respective bobbin 2, however, the respective pivot axis 11 extends in the vicinity of the respective bobbin 2 tangentially to the central axes 3, 9. In FIG. 7, the respective pivot axis 11 is indicated—purely by way of example—for some of the bobbins 2.

Figure 8:
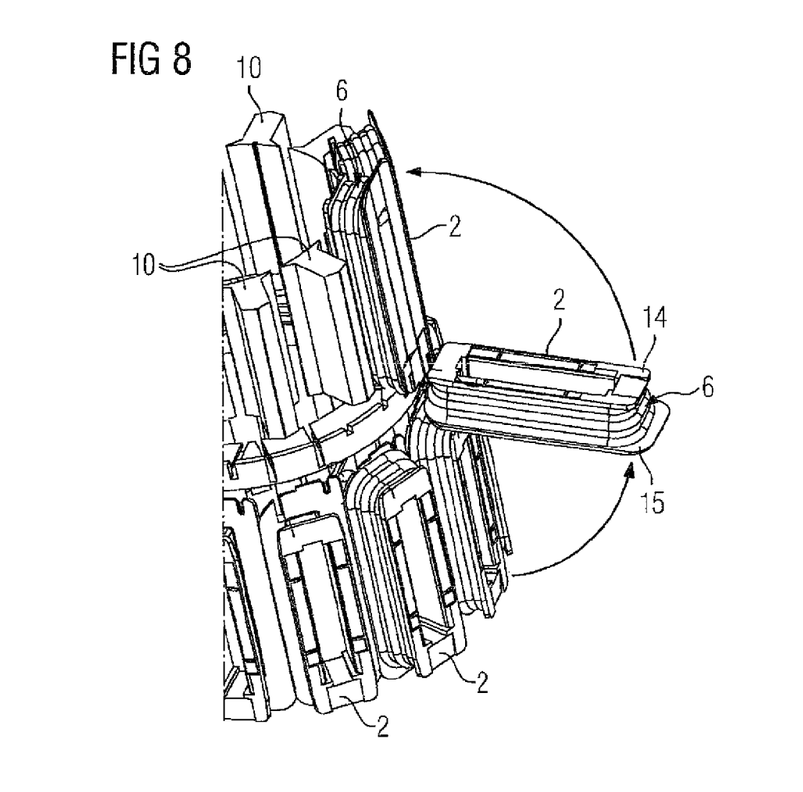
FIG. 8 shows the auxiliary element and the stator of FIG. 6 in a perspective view.

As a result of the bobbins 2 being pivoted—see FIG. 8 once more—the bobbins 2 provided with the coils 6 are pivoted up from radially outside onto one of the stator teeth 10 in each case. After the bobbins 2 have been pivoted up onto the stator teeth 10, the bobbins 2 are accordingly arranged on the stator teeth 10. Analogously to the previous arrangement on the auxiliary element 1, the bobbins 2 are spaced at a radial distance from the central axis 9 of the stator 7. Analogously to the previous arrangement on the auxiliary element 1, they are furthermore arranged, viewed tangentially around the central axis 9 of the stator 7, in a uniformly distributed manner around the central axis 9 of the stator 7. In particular, subsequent to being pivoted up onto stator teeth 10, the bobbins 2 are usually arranged on a cylinder surface around the central axis 9 of the stator 7. Owing to the position of the pivot axes 11, after the bobbins 2 have been pivoted up onto the stator teeth 10, the circuit carrier 4 is furthermore arranged at an axial end of the bobbins 2.

It is possible for the auxiliary element 1 together with the bobbins 2 arranged on the auxiliary element 1 and the circuit carrier 4 arranged on the auxiliary element 1 to be positioned only after the winding of the bobbins 2 in such a way that the central axis 3 of the auxiliary element 1 is aligned with the central axis 9 of the stator 7. Alternatively, it is possible that the auxiliary element 1 is appropriately positioned prior to the winding of the bobbins 2.

What is therefore achieved by means of the production method for producing the stator winding (i.e. the totality of the coils 6) is that—as also in the prior art—a conductor wire 5 is in fact wound in each case onto the bobbins 2 in such a way that the conductor wire 5 wound onto the bobbin 2 forms a coil 6 of the stator winding of the stator 7. In contrast to the prior art, however, on account of the production method the respective conductor wire 5a to 5c for each phase a to c is routed in each case via the circuit carrier 4 from bobbin 2 to bobbin 2 of the respective phase a to c. Connecting conductor ends of the conductor wires 5a to 5c in the circuit carrier 4 is no longer necessary.

Within the scope of the approach explained hereinabove in connection with FIGS. 6 to 8, the bobbins 2 are pivoted through 180° about the respective pivot axis 11 in order to be pivoted up onto the stator teeth 10. Given an appropriate embodiment of the auxiliary element 1, however, it is also possible for the pivot angle to be less than 180°. In particular, in an embodiment of the auxiliary element 1 according to FIG. 4, the pivot angle lies between 90° and 180°. It can be 150°, 135° or 120°, for example. In the embodiment shown in FIG. 5, the pivot angle is 90°. Preferably the pivot angle should not be less than this value.

Embodiments of the fundamental approaches of the present invention explained above in connection with FIGS. 1 to 8 are explained in more detail below. The embodiments can be combined with one another as necessary.

Figure 9:
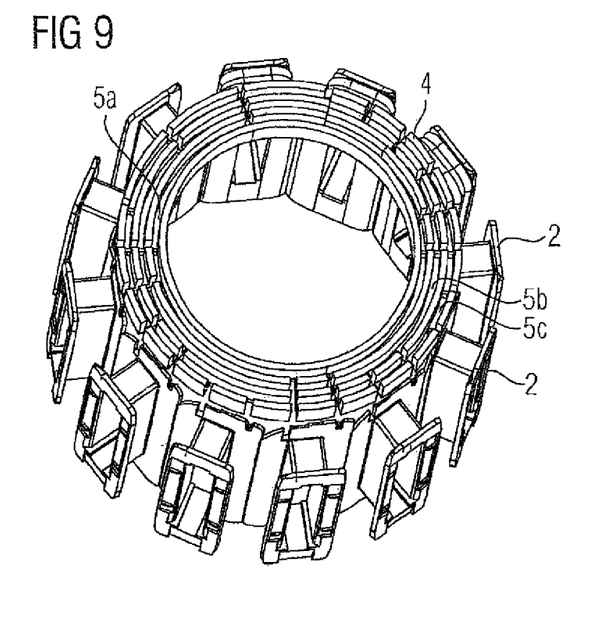
FIGS. 9 and 10 show bobbins and different possible embodiments of circuit carriers.
Figure 10:
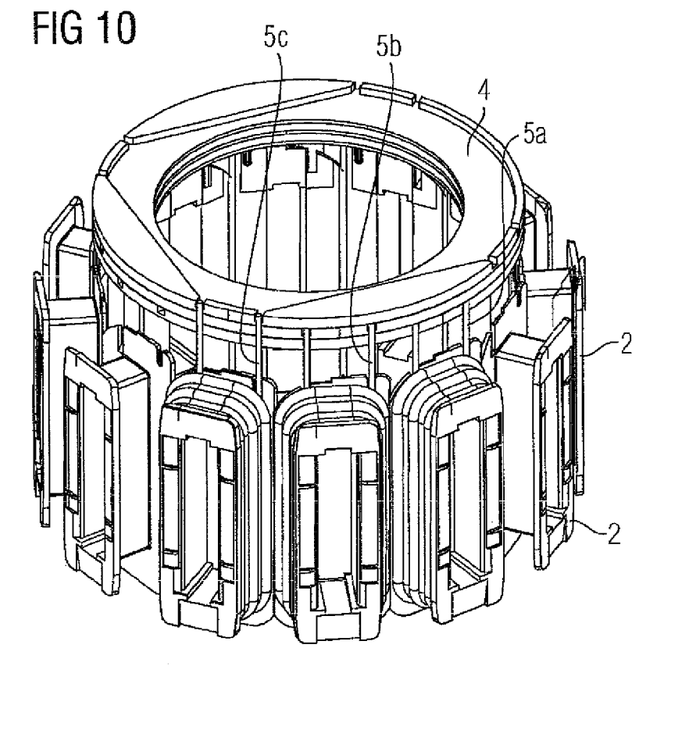

Inside the circuit carrier 4, the conductor wires 5a to 5c of phases a to c are preferably routed free of crossovers. To that end it is possible according to FIG. 9, for example, for the conductor wires 5a to 5c of phases a to c to be routed in the circuit carrier 4 in a radially offset manner from phase a to c to phase a to c. One phase (e.g. phase a) is therefore routed radially outwardly, a further phase (e.g. phase b) radially centrally, and a further phase (e.g. phase c) radially inwardly. Alternatively to a radially offset routing of the conductor wires 5a to 5c in the circuit carrier 4, it is possible according to FIG. 10 for the conductor wires 5a to 5c of phases a to c to be routed in the circuit carrier 4 in an axially offset manner from phase a to c to phase a to c.

Figure 11:
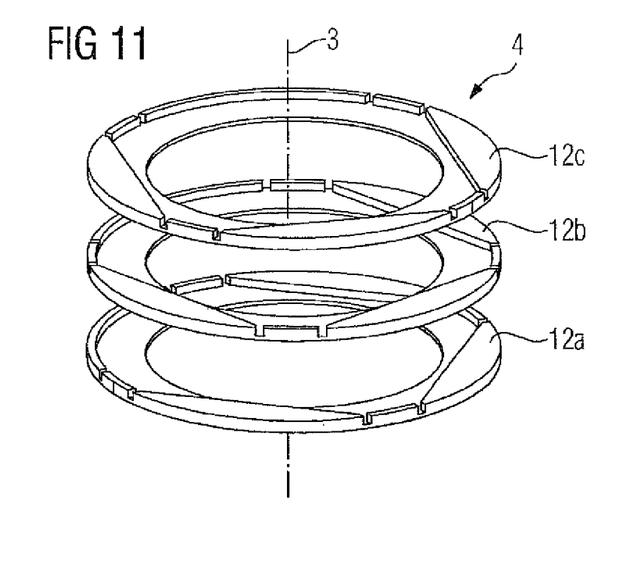
FIG. 11 shows a possible embodiment of a circuit carrier.

In the last-mentioned case—i.e. of the axially offset routing—the circuit carrier 4 can, according to FIG. 11, in particular have, per phase a to c, a separate carrier section 12a to 12c. In this case, within the scope of the production of the stator winding, only one of the carrier sections—the carrier section 12a, for example—is arranged on the auxiliary element 1 in the first instance. Thereafter the bobbins 2a of the corresponding phase a are wound. The next carrier section 12b is then mounted on top of the carrier section 12b and the bobbins 2b of the next phase b are wound. The next carrier section 12c is then mounted on top of the carrier section 12b and the bobbins 2c of the next phase c are wound. After the bobbins 2 have been pivoted up onto the stator teeth 10, the carrier sections 12a to 12c are thereby stacked one on top of the other, viewed in the direction of the central axis 9 of the stator 7.

Figure 12:
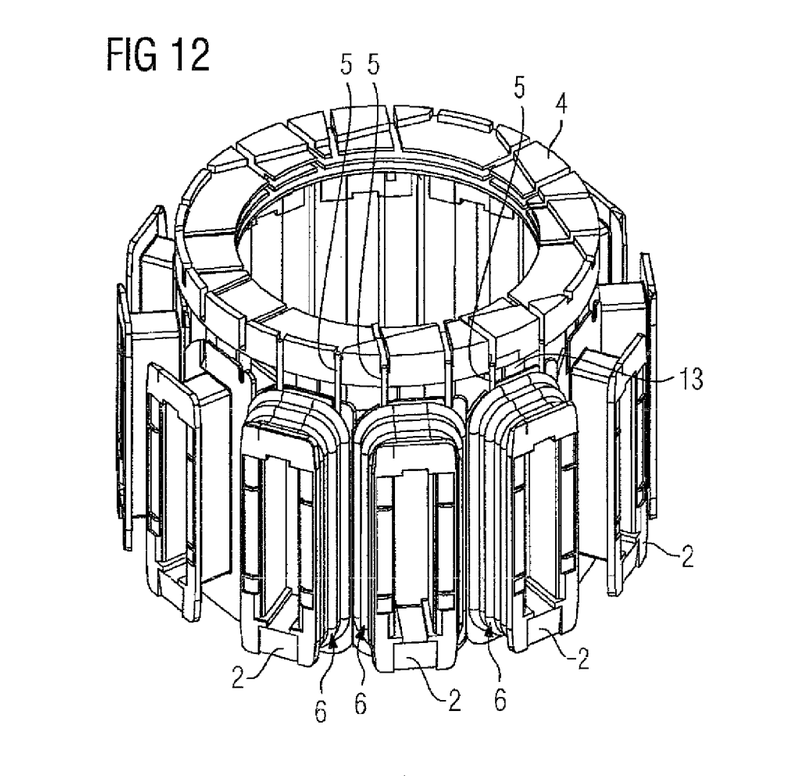
FIG. 12 shows a circuit carrier and bobbins, FIGS. 13 and 14 each show a section of an individual bobbin.

In the simplest case no direct connection exists between the bobbins 2 and the circuit carrier 4 before the bobbins 2 are wound with the conductor wires 5. Alternatively, it is possible, as shown in FIG. 12, for each of the bobbins 2 to have a hinge 13. In this case each of the bobbins 2 is connected to the circuit carrier 4 via the respective hinge 13. This applies at least within the scope of the production of the stator winding, i.e. while the bobbins 2 are arranged on the auxiliary element 1. Preferably it also applies to the finished stator winding, i.e. when the bobbins 2 have been pivoted up onto the stator teeth 10.

Figure 13:
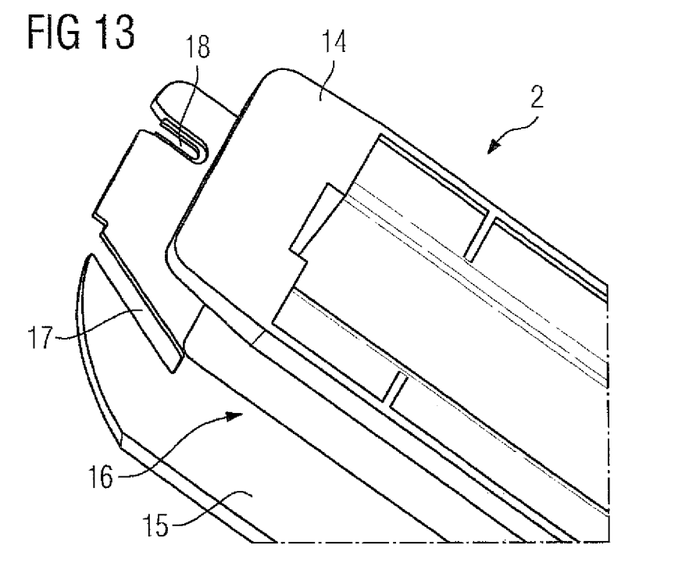
Figure 14:
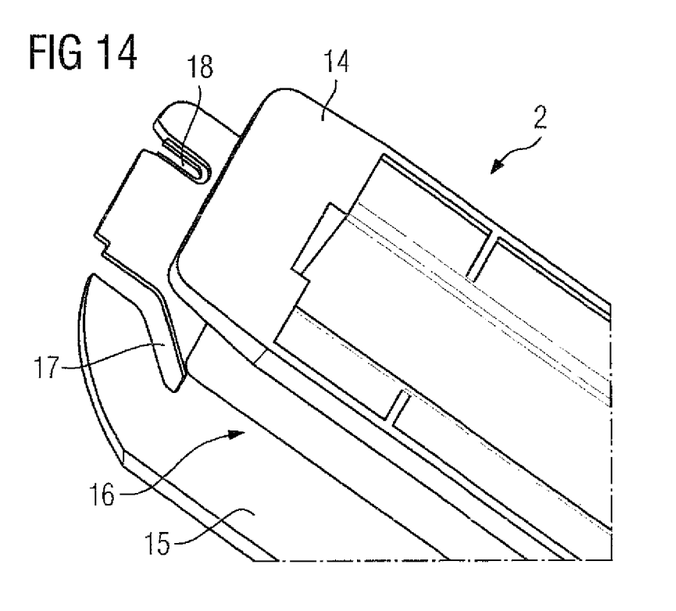

The bobbins 2—see FIGS. 13 and 14 for a single bobbin 2—generally have in each case a first bobbin flange 14 and a second bobbin flange 15. In the state pivoted up onto one of the stator teeth 10, the respective first bobbin flange 14 faces toward the connecting structure 8. The respective second bobbin flange 15 faces away from the connecting structure 8. In the state arranged on the auxiliary element 1, the respective second bobbin flange 15 faces toward the auxiliary element 1, while the respective first bobbin flange 14 faces away from the auxiliary element 1. The bobbin flanges 14, 15 delimit a winding region 16 of the respective bobbin 2. Usually, as illustrated in the schematics of FIGS. 13 and 14, the first bobbin flange 14 is smaller than the second bobbin flange 15.

According to FIGS. 13 and 14, the second bobbin flange 15 has a lead-in groove 17 and a lead-out groove 18. In the course of the production of the stator winding, the respective conductor wire 5 is introduced into the winding region 16 of the respective bobbin 2 by way of the lead-in groove 17 before the respective bobbin 2 is wound. Once the respective bobbin 2 has been wound, the respective conductor wire 5 is brought out from the winding region 16 of the respective bobbin 2 by way of the lead-out groove 18.

According to FIGS. 13 and 14, at least the lead-in groove 17 has—when referred to a main extension direction of the respective bobbin 2—a profile that is not entirely straight. According to FIG. 13, the lead-in groove 17 runs diagonally relative to the main extension direction. According to FIG. 14, the lead-in groove 17 has at least two sections, with at least one of the sections not running parallel to the main extension direction of the respective bobbin 2. As a result, in the state pivoted up onto the stator teeth 10, the lead-in grooves 17 do not extend truly axially with respect to the central axis 9 of the stator 7, but have a tangential component in at least one section.

Figure 15:
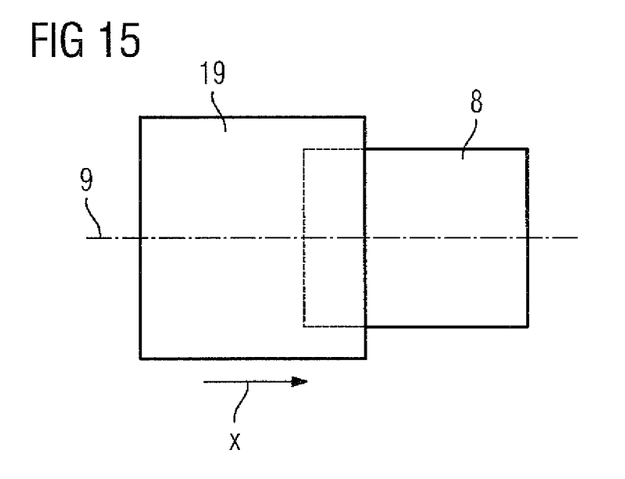
FIG. 15 shows a stator embodied as a star-yoke pack.

The present invention is preferably employed in conjunction with a stator 7 embodied as a star-yoke pack. In this case the star is formed by the connecting structure 8 and the stator teeth 10 protruding radially outward from the connecting structure 8. In such an embodiment of the stator 7, according to FIG. 15, after the bobbins 2 provided with the coils 6 have been pivoted up onto the stator teeth 10, a stator yoke 19 is push-fitted onto the stator teeth 10 axially with respect to the central axis 9 of the stator 7. A push-on direction x is therefore oriented parallel to the central axis 9 of the stator 7. This not only ensures that the bobbins 2 are captively fixed, but also completes the magnetic flux return path.

The present invention offers numerous advantages. In particular it is possible, per phase a to c, to wind the coils 6 by means of a respective continuous conductor wire 5a to 5c. Owing to the profile of the lead-in grooves 17 it is impossible for the conductor wire 5 to come to bear directly on the turns of the respective coil 6 when the bobbins 2 are pivoted up onto the stator teeth 10. This results in particular in an improvement with regard to compliance with clearances in air and creepage distances that are to be maintained.

To sum up, bobbins 2 are therefore arranged on an auxiliary element 1 in such a way that they are spaced at a radial distance from a central axis 3 of the auxiliary element 1 and are arranged in a uniformly distributed manner tangentially thereto. A circuit carrier 4 is arranged on the auxiliary element 1 radially inside the bobbins 2. For the phases a to c of the stator winding, conductor wires 5a to 5c are wound onto bobbins 2a to 2c associated with the phases a to c. The conductor wires 5a to 5c wound onto the bobbins 2a to 2c thereby form coils 6 of the stator winding. After the winding of one bobbin 2a to 2c in each case, the conductor wires 5a to 5c are routed via the circuit carrier 4 to the next bobbin 2a to 2c of the respective phase a to c that is to be wound in each case. The auxiliary element 1 is arranged relative to a stator 7 in such a way that the central axis 3 of the auxiliary element 1 is aligned with the central axis 9 of the stator 7. The stator 7 has a plurality of stator teeth 10 which protrude radially outward starting from a connecting structure 8 that extends circumferentially around a central axis 9 of the stator 7 spaced at a radial distance r' therefrom. The bobbins 2 provided with the coils 6 are pivoted about a respective pivot axis 11 that extends tangentially to the central axes 3, 9 in the vicinity of the circuit carrier 4. This causes each of the bobbins 2 provided with the coils 6 to be pivoted up onto a respective one of the stator teeth 10 from radially outside.

Although the invention has been illustrated and described in greater detail on the basis of the preferred exemplary embodiment, the invention is not limited by the disclosed examples and other variations can be derived herefrom by the person skilled in the art without leaving the scope of protection of the invention.

What is claimed is:

1. A method for producing a stator winding of a stator, comprising:
    positioning an auxiliary element relative to the stator such as to align a central axis of the auxiliary element with a central axis of the stator;
    arranging bobbins on the auxiliary element at a radial distance from a central axis of the auxiliary element and in uniformly spaced-apart relationship around the central axis of the auxiliary element, when viewed tangentially around the central axis of the auxiliary element;
    arranging a circuit carrier on the auxiliary element radially inside the bobbins;
    winding a conductor wire for each phase of the stator winding onto a corresponding one of the bobbins to form coils of the stator winding;
    routing the conductor wire of each phase via the circuit carrier to another one of the bobbins of said phase and winding the conductor wire onto the other one of the bobbins; and
    pivoting each of the bobbins with the coils about a pivot axis that extends tangentially to the central axis of the auxiliary element and the central axis of the stator in vicinity of the circuit carrier so as to respectively pivot up the bobbins onto radially outwardly protruding stator teeth of the stator from radially outside.

2. The method of claim 1, wherein the bobbins are pivoted by at least 90° about their pivot axes onto the stator teeth.

3. The method of claim 1, wherein the bobbins are pivoted by at least 180° about their pivot axes onto the stator teeth.

4. The method of claim 1, wherein the conductor wire of the one phase is routed in the circuit carrier in a radially offset manner in relation to a conductor wire of another phase.

5. The method of claim 1, wherein the conductor wire of the one phase is routed in the circuit carrier in an axially offset manner in relation to a conductor wire of another phase.

6. The method of claim 1, further comprising providing the circuit carrier for each phase with a separate carrier section, arranging initially one of the carrier sections on the auxiliary element, and placing another one of the carrier sections on the one of the carrier sections only after the conductor wire for said phase has been wound to form the coils.

7. The method of claim 1, further comprising connecting each of the bobbins via a hinge to the circuit carrier.

8. The method of claim 1, further comprising forming each of the bobbins with a first bobbin flange and a second bobbin flange such, when pivoting up the bobbins onto the stator teeth, the first bobbin flange face a connecting structure of the stator that extends circumferentially around the central axis of the stator at a radial distance thereto, and the second bobbin flange faces away from the connecting structure, wherein the conductor wire is introduced through a lead-in groove into a winding region of the one of the bobbins which is delimited by the first and second bobbin flanges, with the lead-in groove extending non-axially with respect to the central axis of the stator and having a tangential component in at least one section, when pivoting up the bobbins onto the stator teeth.

9. The method of claim 8, wherein the first bobbin flange is smaller than the second bobbin flange.

10. The method of claim 1, further comprising pushing a stator yoke onto the stator teeth in axial relation to the central axis of the stator after the bobbins provided with the coils have been pivoted up onto the stator teeth.

11. A stator, comprising:
   a plurality of stator teeth configured to protrude radially outward from a connecting structure that extends circumferentially around a central axis of the stator at a radial distance from the central axis;
   bobbins arranged on the stator teeth at a radial distance from the central axis of the stator and, viewed tangentially around the central axis of the stator, in a uniformly spaced-apart relationship around the central axis of the stator;
   a circuit carrier arranged at an axial end of the bobbins; and
   a conductor wire wound onto each of the bobbins such as to form a coil of a stator winding of the stator,
   wherein, for each phase, the conductor wire is routed via the circuit carrier from the bobbin to another one of the bobbins of the phase in an axially offset manner in the circuit carrier from phase to phase, and
   wherein the circuit carrier has one carrier section per phase, said carrier sections being stacked on top of one another, viewed in a direction of the central axis of the stator.

12. The stator of claim 11, wherein each of the bobbins is connected to the circuit carrier via a hinge.

13. The stator of claim 11, wherein each of the bobbins has a first bobbin flange and a second bobbin flange, said first bobbin flange facing toward the connecting structure, said second bobbin flange facing away from the connecting structure and having a lead-in groove via which the conductor wire is introduced into a winding region of the bobbin, with the winding region being delimited by the first and second bobbin flanges, said lead-in groove configured to extend non-axially and to have a tangential component in at least one section.

14. The stator of claim 13, wherein the first bobbin flange is smaller than the second bobbin flange.

15. The stator of claim 11, further comprising a stator yoke push-fitted onto the stator teeth.

* * * * *